(12) United States Patent
Shiota et al.

(10) Patent No.: US 7,006,837 B2
(45) Date of Patent: Feb. 28, 2006

(54) ELECTRONIC APPARATUS

(75) Inventors: Shinsuke Shiota, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 207 days.

(21) Appl. No.: 10/671,567

(22) Filed: Sep. 29, 2003

(65) Prior Publication Data
US 2004/0100932 A1 May 27, 2004

(30) Foreign Application Priority Data
Nov. 26, 2002 (JP) ............................ 2002-341779

(51) Int. Cl.
*H04Q 7/20* (2006.01)
(52) U.S. Cl. ................ 455/456.1; 455/456; 455/456.6; 455/435.2; 455/123; 455/426.1; 455/434; 455/328; 455/522; 455/69; 370/338; 370/901; 370/229; 370/315
(58) Field of Classification Search ............ 455/456.1, 455/435.2, 456.6, 456, 126, 426.1, 434, 522, 455/69; 370/328, 342, 338, 901, 229, 315; 375/356
See application file for complete search history.

(56) References Cited

U.S. PATENT DOCUMENTS

| | | | | |
|---|---|---|---|---|
| 5,754,542 A | * | 5/1998 | Ault et al. .................... | 370/342 |
| 5,903,618 A | * | 5/1999 | Miyake et al. ............... | 375/356 |
| 5,905,955 A | * | 5/1999 | Bamburak et al. ........... | 455/434 |
| 6,085,085 A | * | 7/2000 | Blakeney et al. ......... | 455/426.1 |
| 6,212,390 B1 | * | 4/2001 | Rune ......................... | 455/456.6 |
| 6,223,030 B1 | * | 4/2001 | Van Den Heuvel et al. ......................... | 455/435.2 |
| 6,334,050 B1 | * | 12/2001 | Skarby ......................... | 455/126 |
| 2003/0022673 A1 | * | 1/2003 | Bantz et al. ................. | 455/456 |
| 2003/0133421 A1 | * | 7/2003 | Sundar et al. ............... | 370/328 |

FOREIGN PATENT DOCUMENTS

| EP | 0 684 707 A1 | | 11/1995 |
|---|---|---|---|
| EP | 684707 A1 | * | 11/1995 |
| EP | 1 207 654 A2 | | 5/2002 |

* cited by examiner

*Primary Examiner*—William Trost
*Assistant Examiner*—Chuck Huynh
(74) *Attorney, Agent, or Firm*—Foley & Lardner LLP

(57) ABSTRACT

An electronic (or computer) apparatus (10) has a current position data output unit (13) and an area data output unit (14) responsive to current position data from the current position data output unit for producing specific country data representative of a specific country including a current position. A wireless LAN connecting unit (12) is preliminarily given a plurality of wireless LAN communication modes corresponding to a plurality of country data. Upon reception of the specific country data, the wireless LAN connecting unit automatically sets, as a selected communication mode, one of the wireless LAN communication modes which corresponds to the specific country data and carries out transmission/reception via a wireless LAN (11) in the selected communication mode. Each of the wireless LAN communication modes is determined by a radio frequency channel and a transmit power level used in a country represented by the country data.

17 Claims, 4 Drawing Sheets

POSITION DATA TABLE

| POSITION DATA | COUNTRY DATA |
|---|---|
| (N,E) = (" ···″ ," ···″ ) | Japan |
| (S,W) = (" ···″ ," ···″ ) | Brazil |
| (N,E) = (" ···″ ," ···″ ) | U.S.A. |
| (N,W) = (" ···″ ," ···″ ) | France |

FIG. 3

DIFFERENT VALUES OF 802.11 STANDARD

| ITEM | EXAMPLES OF VALUES |
|---|---|
| RADIO FREQUENCY CHANNEL | Japan : CH1-14 can be used<br>U.S.A. (FCC) : CH1-11<br>Canada (IC) : CH1-11<br>France : CH10-13<br>Europe (ETSI) : CH1-13<br>Spain : CH10-11 |
| RADIO FIELD STRENGTH | Japan : 10mW/MHz<br>U.S.A. (FCC) : 1000mW<br>Europe : 100mW |

FIG. 4

RADIO FREQUENCY CHANNEL TABLE BASED ON COUNTRY DATA

| COUNTRY DATA | MAXIMUM SET VALUE |
|---|---|
| Japan | 14 |
| U.S.A. | 11 |
| Canada | 11 |
| France | 13 |
| Europe | 13 |
| Spain | 11 |

FIG. 5

TRANSMIT POWER LEVEL TABLE BASED ON COUNTRY DATA

| COUNTRY DATA | SET VALUE |
|---|---|
| Japan | 10mW/MHz |
| U.S.A. | 1000mW |
| Europe | 100mW |

FIG. 6

ELECTRONIC APPARATUS

This application claims priority to prior Japanese patent application JP 2002-341779, the disclosure of which is incorporated herein by reference.

BACKGROUND OF THE INVENTION

This invention relates to an electronic apparatus having a wireless LAN connecting unit.

The electronic apparatus is, for example, a computer apparatus, a PDA (Personal Digital Assistant), or the like. The electronic apparatus will also be called a client apparatus which makes use of functions and data provided by a server computer.

A wireless LAN (Local Area Network) is for use in connecting a computer apparatus (for example, a personal computer) to an object network via wireless connection. The wireless LAN is established between the computer apparatus and the object network by providing the computer apparatus with a wireless LAN connecting unit (for example, a wireless LAN adapter such as a wireless LAN card) and providing the object network with an access point.

At present, the computer apparatus having the wireless LAN connecting unit can not automatically select a wireless LAN communication mode (determined by a radio frequency channel and a transmit power level) in conformity with a wireless specification and radio laws and regulations of each individual country. Therefore, in case where the wireless LAN connecting unit equipped in the computer apparatus does not match the wireless specification and the radio laws and regulations of a country where a user currently stays or lives, the wireless LAN connecting unit equipped in the computer apparatus is replaced by another wireless LAN connecting unit which matches the wireless specification and the radio laws and regulations of the country.

Japanese Unexamined Patent Publication No. JP 2002-185476 A (corresponding to EP 1207654 A2) (which will be referred to as Reference 1) discloses the technique for use in frequency coordination between two different wireless network protocols, such as the IEEE 802.11 protocol and the Bluetooth protocol. The coordination is accomplished by the use of a first radio transceiver operating in accordance with a first communication protocol (which may be the 802.11 protocol) and using a frequency band (which may be 2.4 GHz), a base station connected to a wired network and operating in accordance with the first communication protocol, a second radio transceiver operating in accordance with a second communication protocol (which may be the Bluetooth protocol) and using the above-mentioned frequency band, and a coordinator associated with the base station for, in turn, activating the first radio transceiver, deactivating the first radio transceiver, activating the second radio transceiver, and deactivating the second radio transceiver.

Japanese Unexamined Patent Publication No. JP 07-336294 A (corresponding to EP 0684707 A1) (which will be referred to as Reference 2) describes that national regulations of each country set a maximum limit on the amount of effective isotropic radiated power (EIRP) which may be emitted from a particular type of antenna being used for a particular application. Reference 2 discloses a cellular radio base station arrangement capable of controlling transmit power so that the transmit power does not exceed the maximum limit of EIRP defined by the national regulations.

As described above, in case where the computer apparatus having the wireless LAN connecting unit is used abroad, the computer apparatus may not be connected to the wireless LAN due to the difference in standard or radio laws and regulations from country to country. If the wireless LAN connecting unit itself can not be used in a destination country, another wireless LAN connecting unit having a specification adapted to the destination country must be purchased or borrowed there.

SUMMARY OF THE INVENTION

It is an object of this invention to provide an electronic apparatus (for example, a computer apparatus or a client apparatus) having a wireless LAN connecting unit, which is capable of automatically changing a wireless LAN communication mode (determined by a radio frequency channel and a transmit power level) in conformity with a wireless specification and radio laws and regulations of each area such as a country or a state.

According to this invention, there is provided a computer apparatus having a wireless LAN (Local Area Network) connecting unit for connection with a wireless LAN, the computer apparatus comprising:

a GPS (Global Positioning System) receiver responsive to a GPS signal for producing current position data representative of a current position of the computer apparatus; and an area data output unit responsive to the current position data for producing specific area data representative of a specific area including the current position;

the wireless LAN connecting unit being preliminarily given a plurality of wireless LAN communication modes corresponding to a plurality of area data, respectively, the wireless LAN connecting unit being responsive to the specific area data for automatically setting, as a selected communication mode, one of the wireless LAN communication modes which corresponds to the specific area data, thereby carrying out transmission/reception via the wireless LAN in the selected communication mode.

According to this invention, there is also provided a computer apparatus having a wireless LAN (Local Area Network) connecting unit for connection with a wireless LAN, the computer apparatus comprising:

a current position data output unit for producing current position data representative of a current position of the computer apparatus; and an area data output unit responsive to the current position data for producing specific area data representative of a specific area including the current position;

the wireless LAN connecting unit being preliminarily given a plurality of wireless LAN communication modes corresponding to a plurality of area data, respectively, the wireless LAN connecting unit being responsive to the specific area data for automatically setting, as a selected communication mode, one of the wireless LAN communication modes which corresponds to the specific area data, thereby carrying out transmission/reception via the wireless LAN in the selected communication mode.

According to this invention, there is also provided a client apparatus having a wireless LAN (Local Area Network) connecting unit for connection with a wireless LAN, the client apparatus comprising:

a current position data output unit for producing current position data representative of a current position of the client apparatus; and an area data output unit responsive to the current position data for producing specific area data representative of a specific area including the current position;

the wireless LAN connecting unit being preliminarily given a plurality of wireless LAN communication modes corresponding to a plurality of area data, respectively, the wireless LAN connecting unit being responsive to the specific area data for automatically setting, as a selected communication mode, one of the wireless LAN communication modes which corresponds to the specific area data, thereby carrying out transmission/reception via the wireless LAN in the selected communication mode.

Neither Reference 1 nor Reference 2 discloses a current position data acquiring unit for acquiring current position data representative of a current position of a computer apparatus or a client apparatus, and an area data output unit responsive to the current position data for producing specific area data representative of a specific area including the current position.

Furthermore, neither Reference 1 nor Reference 2 discloses that, upon reception of the specific area data, a wireless LAN connecting unit automatically selects, as a selected communication mode, one of a plurality of wireless LAN communication modes which corresponds to the specific area data.

BRIEF DESCRIPTION OF THE DRAWING

FIG. 3 shows a position data table used in the client apparatus illustrated in FIG. 2;

FIG. 4 shows a setting table used in the client apparatus illustrated in FIG. 2 and including different values of the IEEE 802.11 standard in various countries;

FIG. 5 shows another setting table used in the client apparatus illustrated in FIG. 2; and FIG. 6 shows still another setting table used in the client apparatus illustrated in FIG. 2.

DESCRIPTION OF THE PREFERRED EMBODIMENTS

Figure 1:
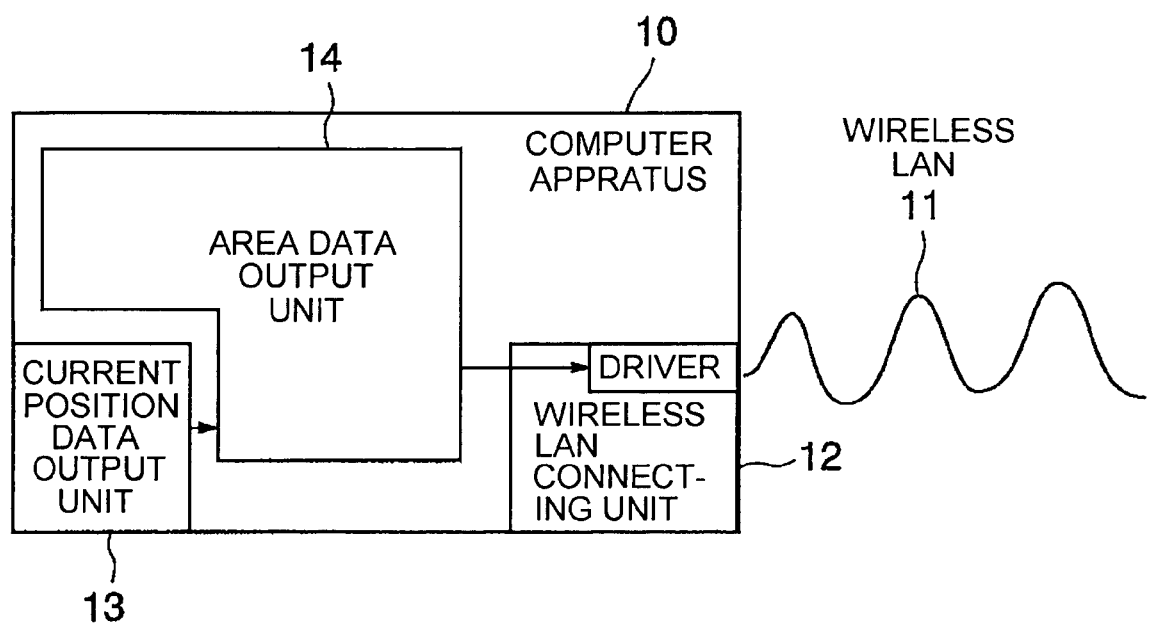
FIG. 1 is a block diagram of a computer apparatus according to a first embodiment of this invention.

Now, description will be made of preferred embodiments of this invention with reference to the drawing.

Referring to FIG. 1, a computer apparatus 10 according to a first embodiment of this invention is, for example, a personal computer and is connected to a wireless LAN (Local Area Network) 11. The computer apparatus 10 comprises a wireless LAN connecting unit 12 for connection with the wireless LAN 11. For example, the wireless LAN connecting unit 12 is a wireless LAN adapter such as a wireless LAN card.

The computer apparatus 10 further comprises a current position data output unit 13 for producing current position data representative of a current position of the computer apparatus 10, and an area data output unit 14 responsive to the current position data for producing specific area data representative of a specific area (such as a country or a state) including the current position.

The wireless LAN connecting unit 12 is preliminarily given a plurality of wireless LAN communication modes corresponding to a plurality of area data. In response to the specific area data, the wireless LAN connecting unit 12 automatically sets, as a selected communication mode, one of the wireless LAN communication modes which corresponds to the specific area data and carries out transmission/reception via the wireless LAN 11 in the selected communication mode.

Specifically, each of the wireless LAN communication modes corresponding to the area data is determined by a radio frequency channel and a transmit power level used in an area represented by area data corresponding thereto. The wireless LAN connecting unit 12 carries out transmission/reception via the wireless LAN 11 by the use of the radio frequency channel and the transmit power level which determine the selected communication mode.

Typically, the area data output unit 14 is responsive to the current position data and produces specific country data representative of a specific country including the current position. In this case, the wireless LAN connecting unit 12 is preliminarily given a plurality of wireless LAN communication modes corresponding to a plurality of country data. Upon reception of the specific country data, the wireless LAN connecting unit 12 automatically sets, as a selected communication mode, one of the wireless LAN communication modes which corresponds to the specific country data and carries out transmission/reception via the wireless LAN 11 in the selected communication mode.

The current position data output unit 13 is, for example, a GPS (Global Positioning System) receiver responsive to a GPS signal for producing current position data representative of a current position of the computer apparatus 10. Alternatively, the current position data output unit 13 may be a gyroscope for producing current position data representative of a current position of the computer apparatus 10.

Figure 2:
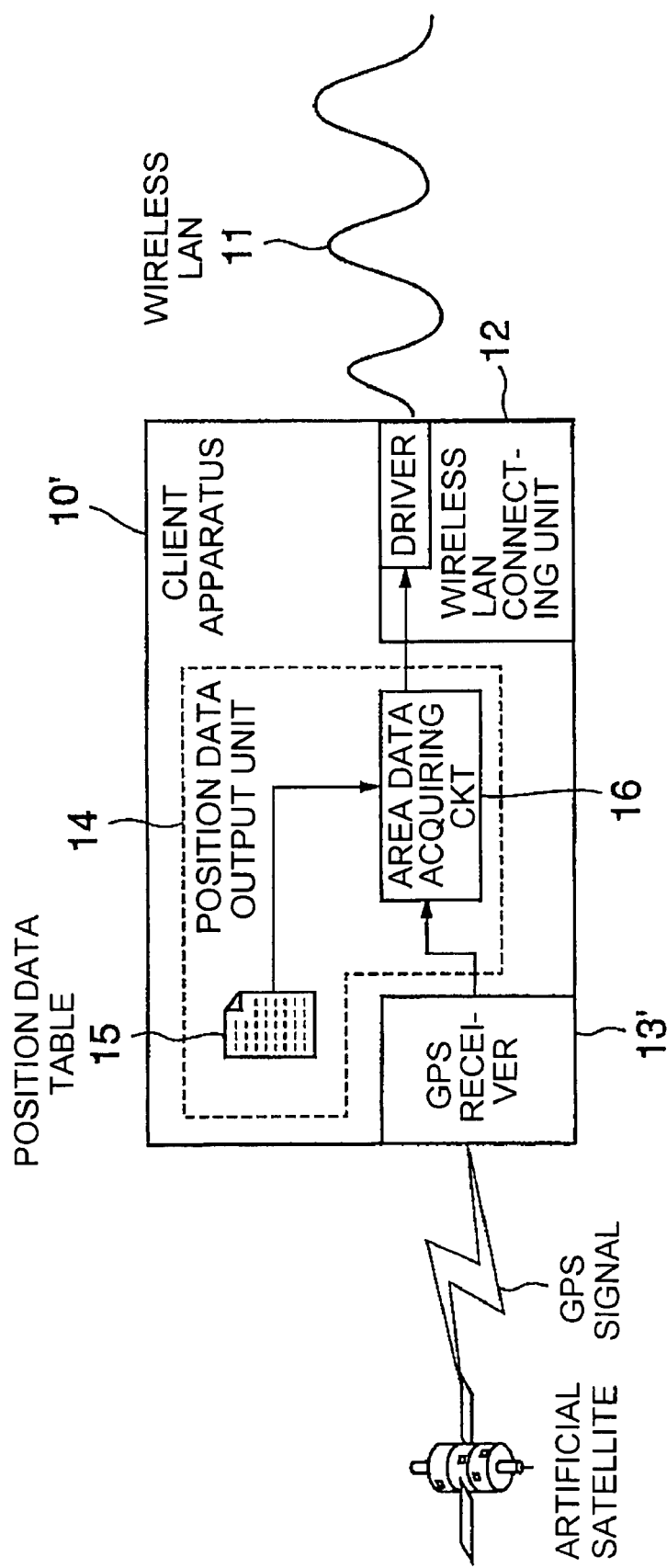
FIG. 2 is a block diagram of a client apparatus according to a second embodiment of this invention.

Referring to FIG. 2, a client apparatus 10' according to a second embodiment of this invention is, for example, a personal computer or a PDA (Personal Digital Assistant) and comprises similar parts designated by like reference numerals. The client apparatus 10' has a GPS (Global Positioning System) receiver 13' as a current position data output unit. The GPS receiver 13' receives a GPS signal from an artificial satellite and produces current position data representative of a current position of the client apparatus 10'.

It is assumed here that the area data output unit 14 is responsive to the current position data and produces specific country data representative of a specific country including the current position. Furthermore, it is assumed that the wireless LAN connecting unit 12 is preliminarily given a plurality of wireless LAN communication modes (each of which is determined by a radio frequency channel and a transmit power level) corresponding to a plurality of country data. Upon reception of the specific country data, the wireless LAN connecting unit 12 automatically sets, as a selected communication mode, one of the wireless LAN communication modes which corresponds to the specific country data and carries out transmission/reception via the wireless LAN 11 by the use of the radio frequency channel and the transmit power level which determine the selected communication mode.

The area data output unit 14 has a position data table 15 and an area data acquiring circuit 16.

Referring to FIG. 3, the position data table 15 is a table including position data and country data associated with each other and memorized in a memory. For example, the position data represent a latitude and a longitude of the position of an international airport of each country. N represents a north latitude, E, an east longitude, S, a south latitude, and W, a west longitude. The country data represents a country in which the international airport is present.

The area data acquiring circuit 16 is implemented by software for calculating, in response to the current position data from the GPS receiver 13' and with reference to the position data table 15, the specific country data including the current position represented by the current position data.

As described above, the wireless LAN connecting unit 12 is preliminarily rendered adaptable to radio frequency channels and transmit power levels of various countries and can change the radio frequency channel and the transmit power level.

Next, operation of the client apparatus 10' illustrated in FIG. 2 will be described in detail.

1. Calculation of Country Data

In response to the GPS signal sent from the artificial satellite and received by the GPS receiver 13' and with reference to the position data table 15, the area data acquiring circuit 16 calculates the country data of the country including the current position in the following manner.

1.1 Acquisition of Current Position Data in GPS Receiver 13'

The GPS receiver 13' is accommodated in the client apparatus 10'. The GPS receiver 13' receives the GPS signal from the artificial satellite and produces the current position data representative of the current position of the client apparatus 10'. The GPS receiver 13' sends the current position data to the area data acquisition circuit 16.

1.2 Position Data Table 15

The position data table 15 memorizes the correspondence between the position data and the country data as illustrated in FIG. 3.

By the use of the current position data obtained by the GPS receiver 13', the position data table 15 is searched to extract the country data corresponding to the current position data.

1.2.1 Reception of Incorrect Position Data

In case where the current position data obtained by the GPS receiver 13' does not match any item in the position data table 15, occurrence of an error is informed to a user to request correction.

2. Automatic Change of Setting in Wireless LAN Connector 12

In each country, the radio frequency channel is defined as illustrated in FIG. 4.

The information shown in FIG. 4 is set in a setting table in the wireless LAN connecting unit 12.

From the setting table in the wireless LAN connecting unit 12, a particular setting which matches the country data calculated by the position data acquiring circuit 16 is extracted.

2.1 Automatic Setting of Radio Frequency Channel

The client apparatus 10' is provided with a table including maximum values of the number of the radio frequency channels in correspondence to the country data, as illustrated in FIG. 5. The table in FIG. 5 is set in the wireless LAN connecting unit 12 as an additional setting table.

In response to the country data calculated by the position data acquiring circuit 16 and with reference to the additional setting table, the wireless LAN connecting unit 12 obtains the maximum value and sets the maximum value in the wireless LAN connecting unit 12 itself.

The additional setting table may be provided in the client apparatus 10' outside the wireless LAN connecting unit 12.

2.1.1 Current Maximum Value>New Maximum Value

It is assumed that a current set value is equal to 14 as the maximum number of channels in Japan and that a new set value is automatically selected to be equal to 11 as the maximum number of channels in United States. In this event, the set value is cut down to 11.

2.2 Automatic Setting of Transmit Power Level

The client apparatus 10' is provided with a table including the transmit power levels corresponding to the country data, as illustrated in FIG. 6. The table in FIG. 6 is also set in the wireless LAN connecting unit 12 as a further additional setting table.

In response to the country data calculated by the position data acquiring circuit 16 and with reference to the further additional setting table, the wireless LAN connecting unit 12 obtains a selected transmit power level and sets the selected transmit power level in the wireless LAN connecting unit 12 itself.

The further additional setting table may be provided in the client apparatus 10' outside the wireless LAN connecting unit 12.

3. Stop of Operation of Wireless LAN Connector 12

During a period in which the setting is automatically changed, the wireless LAN connecting unit 12 stops a connecting operation.

After completion of change of setting, the wireless LAN connecting unit 12 automatically starts connection with the wireless LAN 11.

Referring to FIG. 2, the GPS receiver 13' obtains the current position data and the area data acquiring circuit 16 acquires the country data corresponding thereto. Herein, the following information different from country to country can automatically be changed.

Time zone of the client apparatus 10'

Number of hops in Japan or in Europe in the FH-SS (Frequency Hopping—Spread Spectrum) spectrum modulation system Referring to FIG. 2, the position data table 15 is preliminarily set in the client apparatus 10'. For example, the position data table 15 may be preliminarily set in the client apparatus 10' in the following manner. Specifically, a server connected to the Internet is provided with a position data table including the correspondence between position data and country data. The client apparatus 10' accesses to the server through the Internet to download the data of the position data table from the server to the client apparatus 10'. Thereafter, the client apparatus 10' may periodically contact the server via the Internet to download the data of the position data table from the server to the client apparatus 10' if the position data table in the server is updated.

As described above, in this invention, the computer apparatus (or the client apparatus) having the wireless LAN connecting unit comprises the GPS receiver (or the gyroscope) for obtaining the current position data representative of the current position of the computer apparatus (or the client apparatus). In accordance with the current position data, the current area (such as a country or a state) is identified with reference to map information. In conformity with the wireless specification and the radio laws and regulations specific to each area, the wireless LAN connecting unit automatically changes the wireless LAN communication mode (determined by the radio frequency channel and the transmit power level).

When the user brings the computer apparatus (or the client apparatus) having the wireless LAN connecting unit and the GPS receiver (or the gyroscope) into an international airport and activates the computer apparatus (or the client apparatus), the current position data received by the GPS receiver (or the gyroscope) are changed. From the current position data thus changed and the position data table of the computer apparatus (or the client apparatus), the area data corresponding to the current position are calculated. The current area data are changed and informed to the wireless LAN connecting unit.

With reference to the setting table including the radio frequency channel and the transmit power level and set in the wireless LAN connecting unit, the setting which matches the radio laws and regulations and the wireless specification of the current area are extracted in accordance with the area data.

The setting extracted as mentioned above is incorporated into the wireless LAN connecting unit and is immediately usable at a wireless LAN access point visited by the user for wireless LAN connection.

As described above, this invention provides a computer apparatus (or a client apparatus) having a wireless LAN connecting unit, which comprises a current position data acquiring unit for obtaining current position data representative of a current position of the computer apparatus (or the client apparatus). From the current position data, a current area (such as a country or a state) is identified. In conformity with a wireless specification and radio laws and regulations of each area, a wireless LAN communication mode (determined by a radio frequency channel and a transmit power level) is automatically changed.

With the computer apparatus (or the client apparatus) according to this invention the user can immediately use the computer apparatus (or the client apparatus) to access to the wireless LAN by the use of the wireless LAN connecting unit used in his normal environment by automatically changing the setting without being conscious of the movement from area to area (such as a country or a state).

What is claimed is:

1. A computer apparatus having a wireless LAN (Local Area Network) connecting unit for connection with a wireless LAN, the computer apparatus comprising:
   a GPS (Global Positioning System) receiver responsive to a GPS signal for producing current position data representative of a current position of the computer apparatus; and
   an area data output unit responsive to the current position data for producing specific area data representative of a specific area including the current position;
   the wireless LAN connecting unit being preliminarily given a plurality of wireless LAN communication modes corresponding to a plurality of area data, respectively, the wireless LAN connecting unit being responsive to the specific area data for automatically setting, as a selected communication mode, one of the wireless LAN communication modes which corresponds to the specific area data, thereby carrying out transmission/reception via the wireless LAN in the selected communication mode,
   wherein:
   each of the wireless LAN communication modes corresponding to the area data is determined by a specific radio frequency channel and a specific transmit power level used in an area represented by the area data corresponding thereto;
   the wireless LAN connecting unit carrying out transmission/reception via the wireless LAN by the use of the specific radio frequency channel and the specific transmit power level which determine the selected communication mode.

2. A computer apparatus as claimed in claim 1, wherein:
   the area data output unit is responsive to the current position data and produces specific country data representative of a specific country including the current position;
   the wireless LAN connecting unit being preliminarily given a plurality of wireless LAN communication modes corresponding to a plurality of country data, the wireless LAN connecting unit being responsive to the specific country data and automatically setting, as a selected communication mode, one of the LAN communication modes which corresponds to the specific country data, thereby carrying out transmission/reception via the wireless LAN in the selected communication mode.

3. An electronic apparatus as claimed in claim 1, wherein the area data output unit comprises a position data table, and
   wherein the position data table includes means for periodically updating, from a server provided on the Internet, specific area position data stored in the position data table, the specific area position data including latitude and longitude data.

4. A computer apparatus having a wireless LAN (Local Area Network) connecting unit for connection with a wireless LAN, the computer apparatus comprising:
   a current position data output unit for producing current position data representative of a current position of the computer apparatus; and
   an area data output unit responsive to the current position data for producing specific area data representative of a specific area including the current position;
   the wireless LAN connecting unit being preliminarily given a plurality of wireless LAN communication modes corresponding to a plurality of area data, respectively, the wireless LAN connecting unit being responsive to the specific area data for automatically setting, as a selected communication mode, one of the wireless LAN communication modes which corresponds to the specific area data, thereby carrying out transmission/reception via the wireless LAN in the selected communication mode,
   wherein:
   each of the wireless LAN communication modes corresponding to the area data is determined by a specific radio frequency channel and a specific transmit power level used in an area represented by the area data corresponding thereto;
   the wireless LAN connecting unit carrying out transmission/reception via the wireless LAN by the use of the specific radio frequency channel and the specific transmit power level which determine the selected communication mode.

5. A computer apparatus as claimed in claim 4, wherein:
   the area data output unit is responsive to the current position data and produces specific country data representative of a specific country including the current position;
   the wireless LAN connecting unit being preliminarily given a plurality of wireless LAN communication modes corresponding to a plurality of country data, the wireless LAN connecting unit being responsive to the specific country data and automatically setting, as a selected communication mode, one of the LAN communication modes which corresponds to the specific country data, thereby carrying out transmission/reception via the wireless LAN in the selected communication mode.

6. A computer apparatus as claimed in claim 4, wherein:
   the current position data output unit is a gyroscope for producing the current position data representative of the current position of the computer apparatus.

7. A computer apparatus as claimed in claim 4, wherein the area data output unit comprises a position data table, and wherein the position data table includes means for periodically updating, from a server provided on the Internet, specific area position data stored in the position data table, the specific area position data including latitude and longitude data.

8. A client apparatus having a wireless LAN (Local Area Network) connecting unit for connection with a wireless LAN, the client apparatus comprising:

a current position data output unit for producing current position data representative of a current position of the client apparatus; and an area data output unit responsive to the current position data for producing specific area data representative of a specific area including the current position;

the wireless LAN connecting unit being preliminarily given a plurality of wireless LAN communication modes corresponding to a plurality of area data, respectively, the wireless LAN connecting unit being responsive to the specific area data for automatically setting, as a selected communication mode, one of the wireless LAN communication modes which corresponds to the specific area data, thereby carrying out transmission/reception via the wireless LAN in the selected communication mode, wherein:

each of the wireless LAN communication modes corresponding to the area data is determined by a specific radio frequency channel and a specific transmit power level used in an area represented by the area data corresponding thereto;

the wireless LAN connecting unit carrying out transmission/reception via the wireless LAN by the use of the specific radio frequency channel and the specific transmit power level which determine the selected communication mode.

9. A client apparatus as claimed in claim 8, wherein:

the area data output unit is responsive to the current position data and produces specific country data representative of a specific country including the current position;

the wireless LAN connecting unit being preliminarily given a plurality of wireless LAN communication modes corresponding to a plurality of country data, the wireless LAN connecting unit being responsive to the specific country data and automatically setting, as a selected communication mode, one of the LAN communication modes which corresponds to the specific country data, thereby carrying out transmission/reception via the wireless LAN in the selected communication mode.

10. A client apparatus as claimed in claim 8, wherein:

the current position data output unit is a GPS (Global Positioning System) receiver responsive to a GPS signal for producing the current position data representative of the current position of the client apparatus.

11. A client apparatus as claimed in claim 8, wherein:

the current position data output unit is a gyroscope for producing the current position data representative of the current position of the client apparatus.

12. A client apparatus as claimed in claim 8, wherein the area data output unit comprises a position data table, and wherein the position data table includes means for periodically updating, from a server provided on the Internet, specific area position data stored in the position data table, the specific area position data including latitude and longitude data.

13. An electronic apparatus having a wireless LAN (Local Area Network) connecting unit for connection with a wireless LAN, the electronic apparatus comprising:

a current position data output unit for producing current position data representative of a current position of the electronic apparatus; and an area data output unit responsive to the current position data for producing specific area data representative of a specific area including the current position;

the wireless LAN connecting unit being preliminarily given a plurality of wireless LAN communication modes corresponding to a plurality of area data, respectively, the wireless LAN connecting unit being responsive to the specific area data for automatically setting, as a selected communication mode, one of the wireless LAN communication modes which corresponds to the specific area data, thereby carrying out transmission/reception via the wireless LAN in the selected communication mode, wherein:

each of the wireless LAN communication modes corresponding to the area data is determined by a specific radio frequency channel and a specific transmit power level used in an area represented by the area data corresponding thereto;

the wireless LAN connecting unit carrying out transmission/reception via the wireless LAN by the use of the specific radio frequency channel and the specific transmit power level which determine the selected communication mode.

14. An electronic apparatus as claimed in claim 13, wherein:

the area data output unit is responsive to the current position data and produces specific country data representative of a specific country including the current position;

the wireless LAN connecting unit being preliminarily given a plurality of wireless LAN communication modes corresponding to a plurality of country data, the wireless LAN connecting unit being responsive to the specific country data and automatically setting, as a selected communication mode, one of the LAN communication modes which corresponds to the specific country data, thereby carrying out transmission/reception via the wireless LAN in the selected communication mode.

15. An electronic apparatus as claimed in claim 13, wherein:

the current position data output unit is a GPS (Global Positioning System) receiver responsive to a GPS signal for producing the current position data representative of the current position of the electronic apparatus.

16. An electronic apparatus as claimed in claim 13, wherein:

the current position data output unit is a gyroscope for producing the current position data representative of the current position of the electronic apparatus.

17. An electronic apparatus as claimed in claim 13, wherein the area data output unit comprises a position data table, and wherein the position data table includes means for periodically updating, from a server provided on the Internet, specific area position data stored in the position data table, the specific area position data including latitude and longitude data.

* * * * *